April 28, 1959  A. QUINCHE ET AL  2,883,706
ROTARY INJECTION MOLDING MACHINE FOR PLASTIC COLLAPSIBLE TUBES
Filed Aug. 5, 1954  7 Sheets-Sheet 1

INVENTORS
Albert Quinche
Edouard Lecluyse
BY Cushman Darby & Cushman
ATTORNEYS

April 28, 1959  A. QUINCHE ET AL  2,883,706
ROTARY INJECTION MOLDING MACHINE FOR PLASTIC COLLAPSIBLE TUBES
Filed Aug. 5, 1954  7 Sheets-Sheet 2

INVENTOR
Albert Quinche
Edouard Lecluyse
BY Cushman, Darby & Cushman
ATTORNEYS

April 28, 1959 A. QUINCHE ET AL 2,883,706
ROTARY INJECTION MOLDING MACHINE FOR PLASTIC COLLAPSIBLE TUBES
Filed Aug. 5, 1954 7 Sheets-Sheet 3

INVENTOR
*Albert Quinche*
*Edouard Lecluyse*

BY *Cushman, Darby & Cushman*
ATTORNEYS

INVENTORS
Albert Quinche
Edouard Lecluyse

BY Cushman, Darby & Cushman
ATTORNEYS

FIG.12.

April 28, 1959     A. QUINCHE ET AL     2,883,706
ROTARY INJECTION MOLDING MACHINE FOR PLASTIC COLLAPSIBLE TUBES
Filed Aug. 5, 1954     7 Sheets-Sheet 7

FIG.13.

United States Patent Office 2,883,706
Patented Apr. 28, 1959

2,883,706

ROTARY INJECTION MOLDING MACHINE FOR PLASTIC COLLAPSIBLE TUBES

Albert Quinche, St.-Sulpice, and Edouard Lecluyse, Vevey, Switzerland, assignors, by mesne assignments, to Bradley Container Corporation, Maynard, Mass., a corporation of Delaware Application August 5, 1954, Serial No. 447,974

9 Claims. (Cl. 18—30)

The subject matter of the present invention is a machine for molding articles of thermoplastic material, comprising at least one heated injection box for receiving the material to be injected, at least one mold for receiving the material from the said box, said mold including a matrix and a die engaged in the said matrix, the said die being carried by a rotating member provided with a plurality of such dies and means for effecting the indexing of the said rotating member to bring different dies of the rotating member one-by-one opposite the said matrix for the purpose of forming the mold with the latter.

The accompanying drawings represent, by way of example, an embodiment of the machine forming the subject matter of the invention.

The machine represented, which is intended for molding, on an extruded body, the head of flexible tubes of thermoplastic material, comprises a pedestal 1 on which is fixed a stand consisting of a base 2 which supports two pillars 3 and 4, the top ends of which are connected by a cross bar 5. An injection box 6, which is heated by an electrical heating member 7 which surrounds it and in which the material to be injected (polyethylene for example) is carried in the molten condition, is supported by a bridge mounted in a regulatable manner on the pillars 3 and 4. This bridge consists of a lower cross bar 8, which supports the injection box 6, and of an upper cross bar 9, which is connected to the said lower cross bar by two braces 10 and 11, which support a cylinder 12 in which there can be displaced a piston 13, the rod 14 of which has a bottom part of smaller diameter which is capable of passing into the bore of the box 6 in order to constitute a piston in the latter. A return screw 15, which is fixed to the lid 16 of the cylinder 12 and which cooperates with a spoke nut 17 which rests on the cross bar 5, renders it possible to change the position of the said bridge along the pillars 3 and 4.

The pillar 4 of the stand consists of two parts 18 and 19 which are connected rigidly by a sleeve 20, and, pivoted on the bottom part 18 of this pillar, is a rotating member or turret 21 which is adapted to be intermittently rotated by a hydraulic motor 22. Of course, the rotating member can be pivoted about an independent support rather than on the pillar 4.

Figure 3:
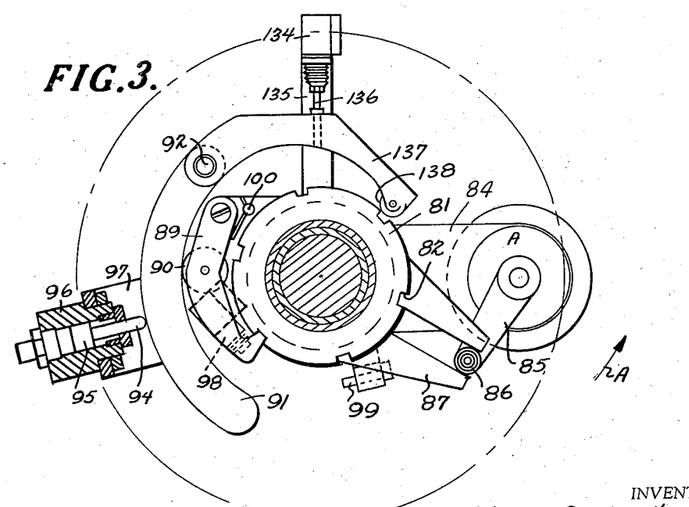
Figure 3 is a plan, on a larger scale, of the indexing mechanism of the revolving table of this machine.
Figure 4:
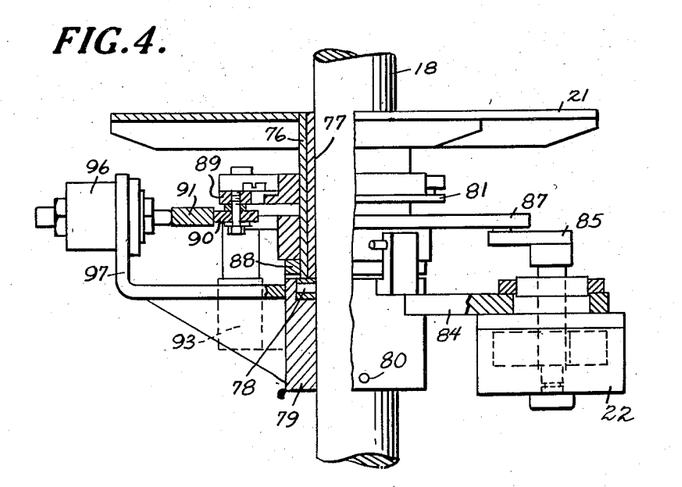
Figure 4 is an elevation of this mechanism partly in axial section.
Figures 5, 6, 7:
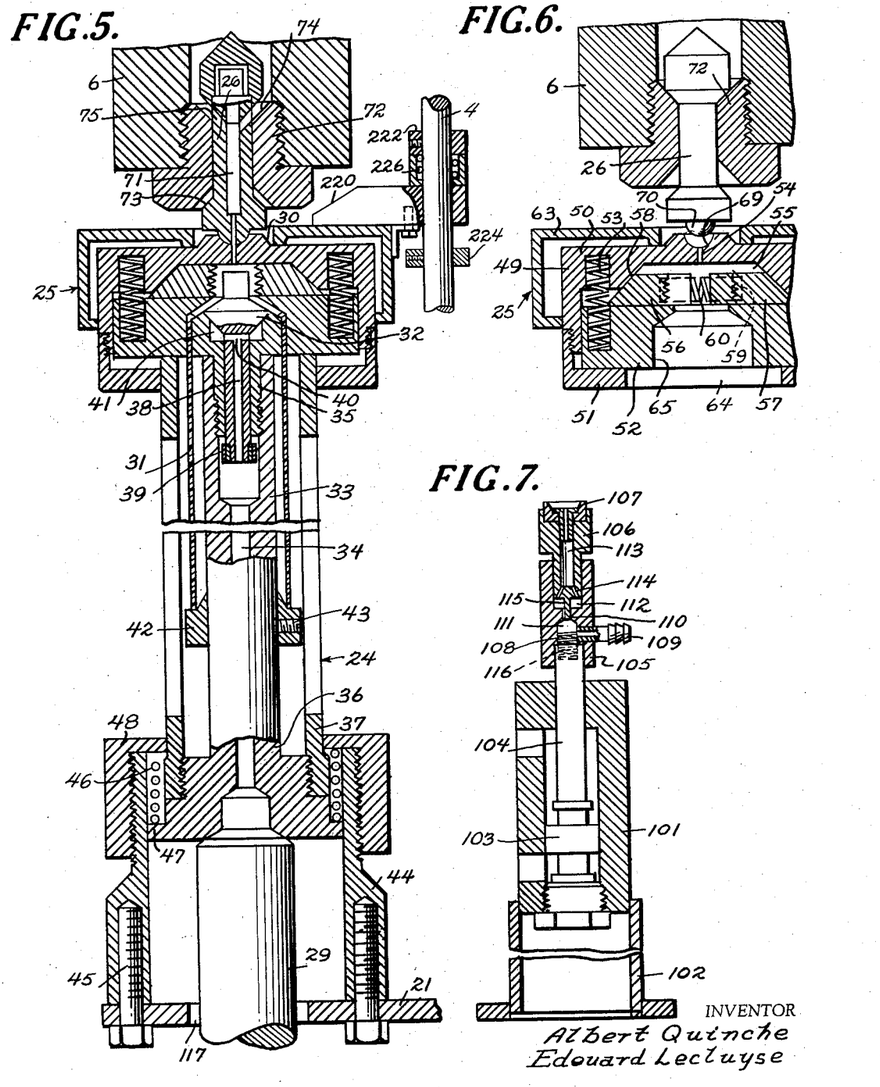
Figure 5 is an axial section, on a larger scale, of the injection head of the machine and of a mold arranged in the filling position beneath this head.
Figure 6 is a partial section, on the same scale as Figure 5, of the injection head and of a part of the said mold, in another position of operation of the machine.
Figure 7 is an axial section, on a smaller scale than Figures 5 and 6, of the pneumatic mechanism for ejecting the molded article.

This rotating member 21, which is represented in detail in Figures 3 and 4, is adapted to carry six removable dies such as that represented at 24 in Figure 5, to bring them successively beneath a matrix 25 and an injection nozzle 26, also represented in Figure 5, the said nozzle being arranged on the base of the injection box 6. A cylinder 27, which is fixed beneath the base 2, has a piston 28, to which is connected a piston rod or plunger 29 is intended to raise the different dies 24 one-by-one to cause them to cooperate with the matrix 25 for the purpose of constituting a mold.

In the machine represented, the formation of the tube heads is carried out by the injection of the thermoplastic material contained in the injection box 6 into a mold formed between the single matrix 25 and one of the six dies 24 carried by the rotating member 21 and sequentially engaging in this matrix, this matrix and this die being caused, under the action of the lower piston 28, to cooperate, as represented in Figure 5, in bounding a cavity 30 of a shape corresponding to that of the head to be molded into which passes the top end of an extruded length of tube 31 previously arranged on the die 24 and intended to constitute the body of the tube.

On referring to Figure 5, it is seen that the die 24 comprises an upper element 32 forming a part of the end of the die, which is intended to be engaged in the matrix 25, which element is mounted for movement on an element 33; the latter, which is provided with an axial longitudinal passage 34, comprises three parts 35, 36 and 37 which are assembled by screw-threading, the last-mentioned part 37 forming a pusher, the object of which will be explained hereinafter.

The element 32 has a tubular rod 38 engaged in the passage 34 and co-axial with the latter; this rod 38 is provided at its end with a stop 39 which is intended for limiting the longitudinal displacement of the element 32 in one direction, the stop 39 coming into abutment with the bottom end of the part 35. The wall of the tubular rod 38 is traversed by a radial passage 40 which leads into a chamber 41, made in the part 35 of the element 33. A ring 42, which is fixed by a lateral screw 43 on the part 36 of the die, constitutes a regulatable stop on which rests the lower end of the length of tube 31 which is threaded, at a charging position of the rotating member on the head of the die formed by the part 35 of the latter.

The die 24 thus formed is mounted for axial movement in a socket 44 fixed by two screws 45 to the rotating member 21, a helical spring 46 resting, on the one hand, on a collar 47 provided on the base of the part 36 of the die and, on the other hand, on a screw-threaded cap 48 which is screwed on the socket 44, and tending to keep the die in its bottom position, the part 36 of the latter normally resting on the rotating member 21, but being movable upwardly against the action of this spring to be brought to cooperate with the matrix 25 in the position shown in Figure 5.

This matrix 25 (see Figure 6) comprises a case 49, in two parts 50 and 51, which are assembled together by a screw-thread, in which is housed an operating element 52 which is mounted for vertical movement in the part 50 of the case and is acted upon by four springs 53 which tend to keep it in its bottom position represented in Figure 6.

The upper part 50 of this case is traversed by an axial passage 54 for the admission of the material to be molded and has a cavity 55 provided with spaced inclined side walls in which are housed two chill-molds 56 and 57 each provided, on its periphery, with an inclined plane 58, the slope of the latter being similar to that of the inclined side wall of the cavity 55. Molding means, such as the chill-molds 56 and 57 carry, in housings 59 made for this purpose, two springs 60 which tend to space them apart. They also have rectilinear parts opposite each other which are intended to come into contact during the molding operation, and recesses, the wall of each of which is provided with a screw-thread, these recesses benig intended for making a collar provided with a screw-thread. Of course, more than two chill-molds could be utilized and are contemplated.

The case 49 is, for the larger part, housed in a covering 63 which constitutes, with the case, a chamber for the circulation of a cooling liquid. The part 51 of the case 49 is provided with an orifice 64 for the passage of the top end of the pusher 37 of the die which is intended to cause the element 52 to slide upwardly, which element has inside it a recess 65, the wall of which cooperates in bounding the mold cavity 30 during the molding operation. This recess 65 is intended to receive the part 35 of the die 24, the length of tube 31 previously arranged on the die stopping up the annular space between the periphery of the part 35 of the die and the circular wall of the recess 65, as shown in Figure 5.

The matrix 25, has abutments or arms 220 (one of which is shown in Fig. 5) secured thereto and slidably guided on the pillars 3 and 4. The combination of matrix 25 and arms 220 thus constitutes a slidable bridge assembly which assumes a predetermined rest position by virtue of supports 224 on the pillars, against which it is normally held by springs 226.

When the die 24, the length of tube 31 which it carries and the pusher 37 are lifted by the action of the rod 29 of the piston 28 and are introduced into the orifice 64, the sliding element 52 of the matrix is pushed back in opposition to the action of the springs 53 and displaces the chill-molds 56 and 57 which slide towards the inside of the cavity 55 and approach each other. When the said chill-molds rest on the end wall of the cavity 55 (see Figure 6), their rectilinear parts are in contact, the die is housed at the bottom of the matrix.

The result of the upward displacement of the die 24 is to produce the raising of the matrix 25 which is removed from its support in opposition to the action of the spring 226, the effect of this movement being to produce the fitting together of a hemispherical cavity 69, provided in the part 50 of the case 49 of the die, and of a hemispherical projection 70 of the same size provided at the bottom end of the injection nozzle or pipe 26, the passages 54 in the matrix and 71 in the said nozzle being thus placed opposite each other. As the die and the matrix continue to be displaced upwards, they push the movable injection nozzle or pipe 26 back into a plug 72, screwed to the bottom of the injection box 6, until it is in the position represented in Figure 5 in which the material contained in the said box can flow into the mold. In this position, the nozzle 26 is moved away from a conical seating 74 provided at the top end of the plug 72, so that the molten material can flow from the box 6 into the molding cavity 30 of the mold, passing through radial passages 75 made in the nozzle 26, the axial passage 71 of the latter and the passage 54 made in the case 49 of the matrix. It should be noted that the contact pressure of said matrix 25 with injection nozzle 26 is restricted by the bridge assembly so as to prevent damage to either the matrix or nozzle by excessive contact pressure. This is illustrated in Figure 5.

As shown in Figure 5, the bridge assembly, including matrix 25 and arms or abutments 220 is raised until it stops against stop members 222 mounted on the support pillars.

When the injection has been effected and the time necessary for the stabilization of the injected material has expired, the lower piston 28 is drawn back and the matrix 25, which is no longer upheld by the pusher 37 of the die, resumes its initial position represented in Figure 6, the movable element 52 resuming its bottom position and the chill-molds 56 and 57, under the action of the springs 60, separating from each other, thus producing the freeing of the head molded on the extruded length of tube 31.

The downward movement of the die 24 is then continued under the action of the spring 46 as the piston rod 29 is pulled back, the die and the tube provided with its molded head dropping sufficiently for being completely disengaged from the matrix 25 when the piston 28 has arrived into its bottom position in which its rod is likewise disengaged from the revolving plate 21.

It is to be noted that the descent of the matrix 25 produces the descent of the injection nozzle 26 and thus the closing of the latter (see Figure 6).

The rotating member 21, which carries six dies 24 such as the dies represented in Figure 5, is for the purpose of bringing these different dies successively from a charging position, in which the tubular body 31 of the tube is placed on the die, either manually or with the aid of an automatic charging device, into the position of injection beneath the nozzle 26 as shown in Figure 6, and then into a discharging position, in which the tube, provided with its molded head and covering the die, is driven from the latter.

The rotating member 21, which comprises an indexing mechanism, one embodiment of which is represented in detail in Figures 3 and 4, has a hub 76 which is provided with a bronze socket 77 and pivots round the bottom part 18 of the pillar 4 of the stand on a ball bearing 78 housed in a sleeve 79 which is fixed to the pillar by a pin 80. This hub 76 carries a disc 81, the periphery of which has six notches that are regularly spaced apart. The indexing mechanism proper can comprise the alternate rotation hydraulic motor 22 supported by an arm 84 which is fixed to the sleeve 79 and which has a crank 85, the crank pin 86 of which is provided with a ball bearing that is housed in a rectilinear guide made in a rocker 87 which is loosely pivoted, round the hub 76 of the rotating member, on a ring 88 which is fixed to the said hub. This rocker 87 carries an indexing means such as pawl 89 which is intended to engage in notches 82 in the disc 81 which is pivoted on the rocker 87 and has a roller 90 adapted to roll on the concave surface of a cam 91 which is itself pivoted at 92 on an arm 93 which is fixed to the sleeve 79 and which is acted upon by a pusher 94 that is fixed to a piston 95 which is housed in a hydraulic cylinder 96 that is also supported by an arm 97 extending from the fixed sleeve 79.

The operation of the indexing mechanism is as follows:

When the motor 22 is started from the position represented in Figure 3, the crank 85 rotates in the direction of the arrow A and produces an oscillating movement of the rocker 87 and of the pawl 89 which, if the pusher 94 is kept in the advanced position represented, is, in turn, kept in engagement with the disc 81 which it drives by means of one of its notches, the roller 90 rolling on the cam 91 during the oscillating movement of the rocker 87.

This oscillating movement continues until a switch 98, fixed to the rocker 87, comes to rest against a stop 99 which is fixed to the fixed sleeve 79, the said switch being then operated and interrupting, by means of an apparatus hereinafter described, and relating to the hydraulic and electric circuits of the machine, the feeding of the motor 22 which stops after having imparted a rotation of one-sixth of a revolution to the rotating member 21.

It is to be noted, on the one hand, that, as the pressure is maintained in the cylinder 96, the pawl 89 is also kept firmly in engagement with the rim 81 by means of its nose engaged in a notch in the latter and, on the other hand, that the driving of the rocker 87 by the motor 22 is effected first of all at an increasing speed and then at a decreasing speed owing to the shape of the Maltese-cross kind of coupling set up between the rocker 87 and the crank pin 86 of the motor 22. In this way, the rotating member 21 is, on its intermittent rotation, first of all started and then progressively slowed down before being stopped positively in its new position. Before effecting its return journey under the action of the motor 22 driven in the opposite direction, the pawl 89 is caused to free itself from the disc 81 owing to the suppression of the action of the cylinder 96, which permits the withdrawal of the cam 91, and to the action of a return spring 100 which tends to separate the pawl 89 from the disc 81.

The indexing mechanism can thus return to its initial position represented without driving the plate 21 back.

As represented in Figure 3, the mechanism for driving the rotating member 21 comprises, in addition, a safety device (the object of which will be indicated hereinafter) which is constituted by a switch 134 which is mounted on the end of an arm 135 which is fixed to the sleeve 79 and which is operated by a stop screw 136 that is carried by an arm 137 pivoted at 92 on the support 93. The said arm 137 has, on its free end, a roller 138 which cooperates with the periphery of the disc 81 and the whole is arranged so that the switch 134 is open when the roller 138 bears on the periphery of the disc but is closed when a notch 82 in the latter arrives beneath the roller 138.

Owing to the rotation of the rotating member, the dies 24 are brought successively, two-sixths of a revolution after the injection position, opposite a pneumatic extracting device, the object of which is to effect the withdrawal of the tubes provided with their molded head.

This device, which is represented in detail in Figure 7, comprises a cylinder 101 which is mounted on a support 102 that is fixed to the base 2 of the stand and a movable piston 103 in the said cylinder and the rod 104 of which is provided with a head formed of a first element 105 that is screwed on the said rod and of a second element 106 which slides in the first element and the front end of which is provided with a rubber sleeve 107. The element 105 has a cavity 108 which communicates, on the one hand, through a union 109, with a source of compressed air (not shown), and, on the other hand, through a passage 110, the opening of which has a conical seating for a ball valve 111, with a bore 112 in which the element 106 is mounted for sliding. This element 106 is traversed by an axial passage 113 opening into this bore 112 through two passages 114 and has an appendage 115 that rests on the ball 111 which is itself kept on its seating by a spring 116.

This extracting device operates as follows:

When the rotating member 21 has stopped, the piston 103 is lifted owing to the introduction of oil under pressure into the lower chamber of the cylinder 101 and the head arranged at the end of the rod 104 and passes through a hole 117 (see Figure 5) made in the rotating member is applied, by means of its rubber sleeve 107, to the bottom face of the die 24 which is situated opposite the device and which is kept elastically against the said sleeve by the action of the spring 46 that surrounds it. The application of the head to the die produces the driving of the element 106 into the element 105 and thus the opening of the ball valve 111 which is raised from its seating by the appendage 115. The compressed air fed through the union 109 can then flow through the axial passages 110 and 113 of the elements 105 and 106 and through the passage 34 of the die 24 to the inside of the chamber 41 formed beneath the element 32 of the die (see Figure 5). The excess pressure thus formed in this chamber produces the raising of the said element 32 and of the tube which covers it and which is then driven violently upwards against a member (not shown) which deflects it in the direction of a receptacle such as a box or a basket. The piston 103 is then brought back into its bottom position represented in Figure 7, the flow of compressed air being interrupted by the ball 111 as soon as the head is separated from the die 24 to resume its withdrawn position, which position allows the free rotation of the rotating member 21.

Figure 8:
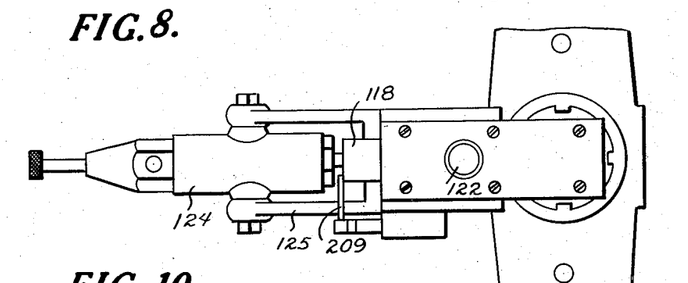
Figure 8 is a plan, on a larger scale, of the charging mechanism of the machine.
Figure 9:
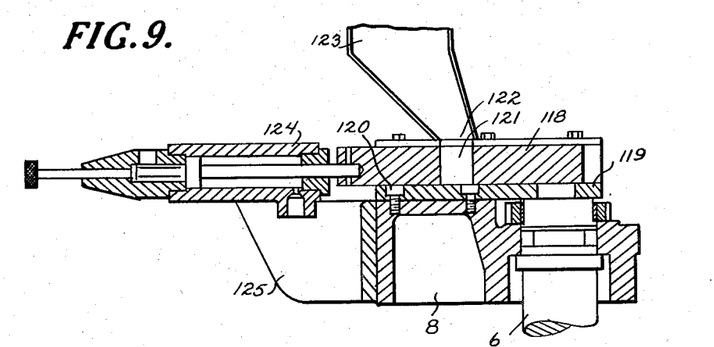
Figure 9 is a vertical longitudinal section of the mechanism shown in Figure 8.

The machine comprises an automatic device for charging the injection box 6, which device is fixed to the bridge that carries the latter and which is represented in detail in Figures 8 and 9. This device comprises principally a charging slide valve 118 mounted in a slide 119 which is fixed by screws 120 on the cross-bar 8 and is arranged between the injection box 6 and the upper cylinder 12, the piston of which effects the ejection of the molten material from the said box. The said slide valve 118 has a cylindrical bore 121 of the same diameter as the bore of the injection box and can, when the piston 13 is in its upper position, be brought from an advanced position, in which the bore 121 is in line with the bore of the box and serves for the passage of the rod 14, to a withdrawn position represented in Figures 8 and 9 in which the said bore 121 is opposite the discharge orifice 122 of a hopper 123 which is intended to contain the pulverulent or granulated plastic material. A cylinder 124, which is mounted on a support 125 fixed to the cross-bar 8, effects the reciprocation of the said slide valve and thus the charging of the injection box from the hopper under certain conditions which will be indicated hereinafter with reference to the electrical diagram of the machine.

Figure 10:
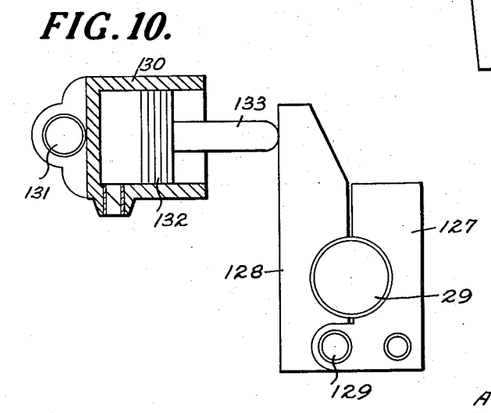
Figure 10 is a detail view of a brake assembly arranged to be associated with an operating piston.

There remains to be mentioned a brake 126 which is arranged on the base 2 of the stand of the machine and which is intended for locking the lower piston 28 in its upper position during the injection. This brake, which is represented in detail in Figure 10, comprises a stationary jaw 127, which is bolted to the base 2, and a movable jaw 128 which is pivoted at 129 to the jaw 127. These two jaws have recesses which are adapted to enclose the rod 29 of the piston 28. A cylinder 130, which is likewise fixed by a bolt 131 to the base 2, has a piston 132, the rod 133 of which rests on the free end of the movable jaw 128. The introduction of oil under pressure into the cylinder 130 effects the clamping of the piston rod 29 between the jaws 127 and 128 and thus the locking of the said piston rod.

Figures 1, 2:
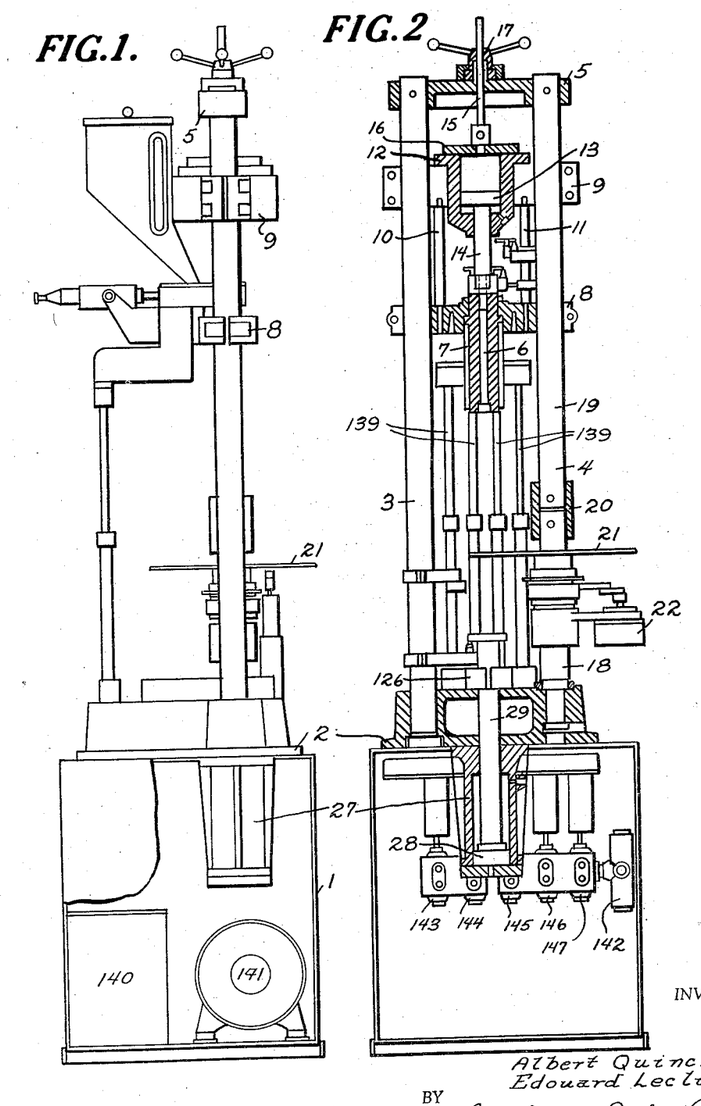
Figures 1 and 2 are views partly in section, taken respectively on the side and in front, certain parts of the machine being omitted.
Figure 11:
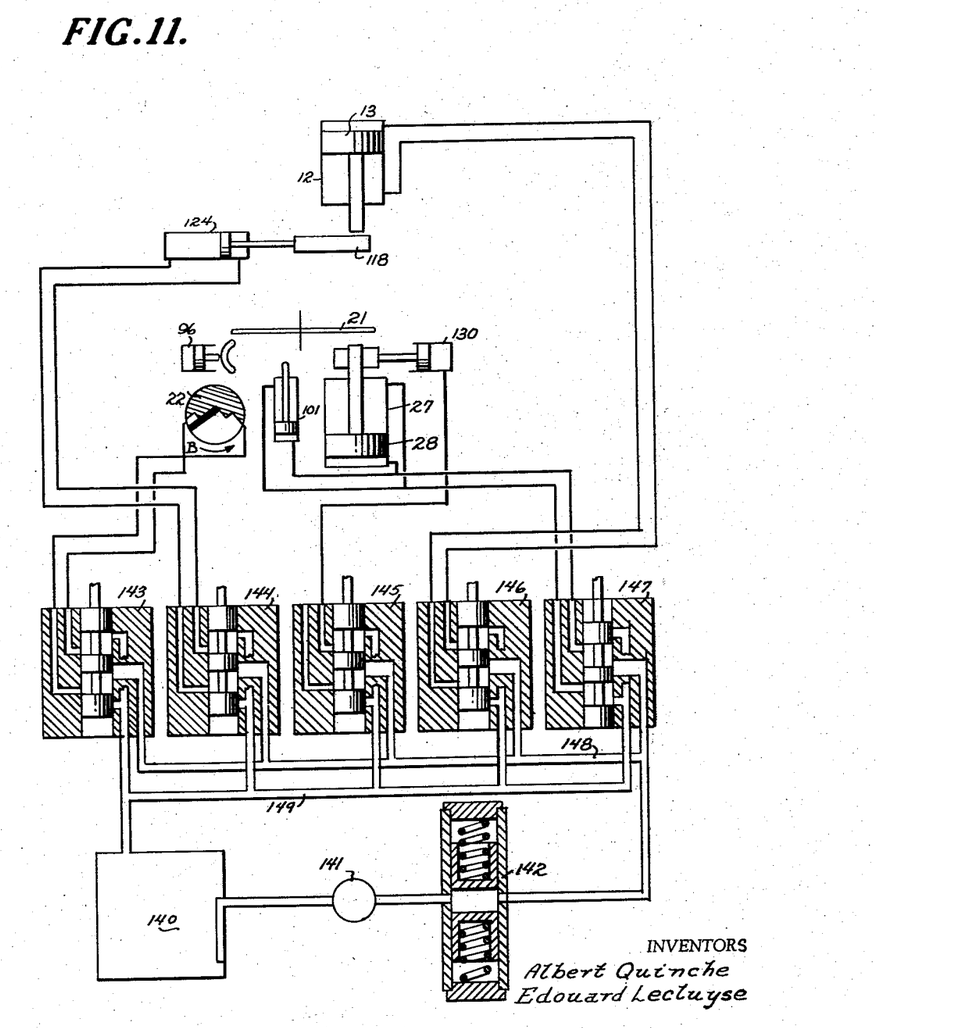
Figure 11 is a diagram of the hydraulic controlling apparatus of the machine.

Before explaining the operation of the machine, let us add that, in the majority of the different operating cylinders already mentioned, the hydraulic apparatus represented diagrammatically in Figure 11 comprises an oil tank 140, a feed pump 141, a hydraulic damping device 142 and five electric valves 143, 144, 145, 146 and 147, these different devices being housed in the pedestal 1 of the machine (see Figures 1 and 2), on which the pipes and electric circuits have been omitted for the sake of clearness with the exception of four telescopic tubes 139 fitted between the fixed base and the movable bridge of the machine and intended for the feeding of the cylinders 12 and 124 carried by the said bridge.

The pump 141, which is fed from the tank 140, receives oil under pressure, through the damping device 142, in a collector 148 which effects the feeding of the five electric valves. The latter, according to the position of their respective side valves, direct the oil under pressure from one side or the other of the cylinders which they control, the other of the said cylinders being simultaneously put into communication with a discharge collector 149 which returns the oil into the tank.

The operation of the machine will now be explained with reference to the electrical diagram represented in Figures 12 and 13.

The machine is fed with three-phase current from an inlet box 150 having three principal fuses mounted on the three phases R, S and T and a circuit breaker mounted on the neutral O. A first transformer 151, the primary of which is connected between the phase T and the neutral O, insures the feeding of a part of the controlling circuits with a lower voltage. A second transformer 152 is intended for feeding, on the one hand, a rectifier 153 which serves for feeding the different circuits with direct current and, on the other hand, the motor 154 of a clock 155 which controls the duration of the injection state of the cycle of operations of the machine.

Figure 12:
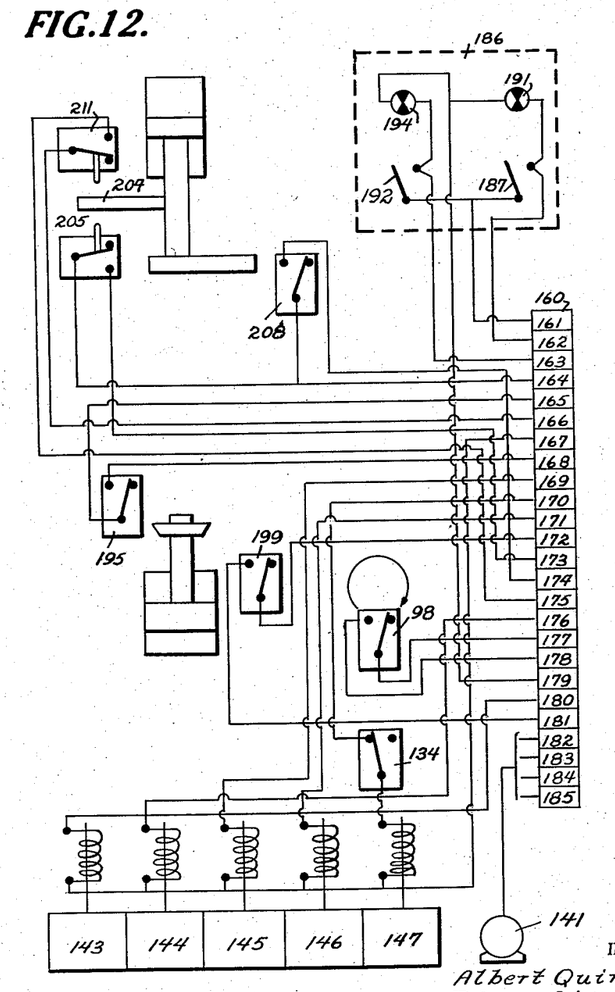
Figures 12 and 13 are a diagram of the electrical apparatus of the machine.
Figure 13:
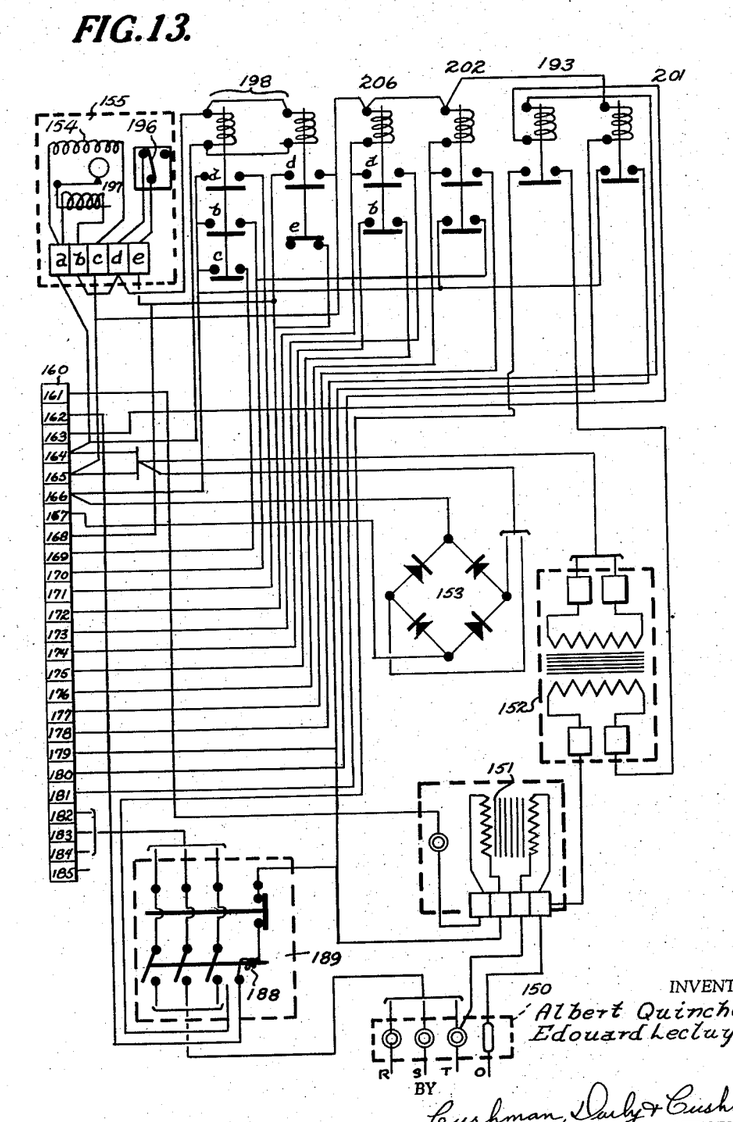

In order to effect the starting, the different hydraulic devices being in the position represented in Figure 11, which is the position of rest except for the electric valve 147, the slide valve of which is in the position of excitation of the electric valve for the reasons hereinafter explained, the operator operates a first switch 187 of a switch box 186, the effect of which is as follows:

(a) to close a circuit between the terminals 161 and 162, which are fed from the transformer 151 of a connection box 160, half of which is represented in Figure 12 and the other half in Figure 13 and which comprises twenty-five terminals numbered from 161 to 185, and thus to apply voltage to a controlling winding 188 of a three-phase switch 189; this effects the engagement of this switch and the starting of the motor of the pump 141 which it controls;

(b) to make a circuit comprising a signal lamp 191, which is lighted, between the terminals 161 and 179 of the box 160.

The operator then operates a second switch 192 of the switch box 186, the effect of which is as follows:

(a) to close the circuit between the terminals 161 and 163 of the box and thus to effect the operation of a relay 193, the control winding of which is connected between the latter terminal and the terminal 179 of the box, the closing of the movable contact of this relay effecting the feeding of the transformer 152, the secondary of which is connected to the terminals 164 and 165 of the box, and also that of the rectifier 153, the primary of which is connected to the said terminals and the secondary of which is connected to the terminals 166 and 167 of the box. (These terminals 164, 165 and 166, 167 act as feed terminals.)

(b) to make a circuit comprising a signal lamp 194, which is lighted, between the terminals 161 and 179 of the box.

The electric valves 143 and 147 being in the position representing Figure 11, the starting of the pump 141 has the effect of producing the rise of the lower piston 28, housed in the cylinder 27, which raises a die 24 and the matrix 23 up to the filling position represented in Figure 5, the nozzle 26 being simultaneously brought into the open position.

Towards the end of its movement, the piston 28, in passing, closes momentarily a switch 195 and thus makes a circuit between the terminals 165 and 168 of the box, the effect of which is as follows:

(a) to throw in a clutch of the clock 155 which then effects the driving of a cam which is intended to operate a switch 196 of this clock after a predetermined regulatable time; this clutch is controlled by a winding 197 which is then included in the following new circuit: feeding terminal 164 of the box, terminal a of the clock, winding 197 of the clutch, terminal b of the clock, terminal d of the clock, closed switch 196 of the clock, terminal 168 of the box, the above-mentioned switch 195 (then closed) and feeding terminal 165 of the box;

(b) to operate the two armatures of a relay 198, the windings of which, are connected in parallel, are fed by a circuit made between the feeding terminals 164 and 165 by the terminal d of the clock, the switch 196 of the clock in the position represented, the terminal e of the clock and the terminal 168 of the box, the last-mentioned terminal being connected to the feeding terminal 165 by the circuit, then closed, of the switch 195. The operation of this relay 198 makes new circuits, namely:

(1) By means of the movable contact a, then closed, of the relay, a circuit between the terminals 166 and 171 of the box, this circuit effecting the operation of the electric valve 146, the winding of which is connected between the terminals 167 and 171 of the box, the said electric valve then changing position and thus producing the descent of the injection piston 13 which is housed in the upper cylinder 12.

(2) By means of the movable contact c, then closed, a circuit between the terminals 166 and 169 of the box, this circuit effecting the operation of the electric valve 145, the winding of which is connected between the terminals 167 and 169 of the box, this electric valve then changing position and producing the feeding of the cylinder 130 and thus the pressing of the brake 126 which locks the lower piston 28 in the raised position during the injection.

(3) By means of the movable contact d, then closed, a circuit between the terminals 165 and 168 of the box 160, which circuit is made in parallel with that of the switch 195 and which insures the maintenance of the excitation of the relay 198 notwithstanding the opening of this switch 195 which is produced as soon as the piston 28 has passed.

The operation of the relay 198 also has the effect of closing the contact b of the relay and of opening the contact e of the latter, which contacts are connected in circuits, the object of which will be hereinafter explained.

After a predetermined time which is intended for enabling a sufficient stabilization of the injected material to be effected, the switch 196 is automatically opened by the action of a cam of the clock, the effect of which opening is to interrupt the excitation of the relay 198, the two armatures of which drop into their initial position represented. The opening of the contacts a and c of this relay 198 has the effect of interrupting the excitation.

(a) of the electric valve 146 which resumes its initial position and thus effects the withdrawal of the injector piston 13;

(b) of the electric valve 145 which resumes its initial position and thus produces the emptying of the cylinder 130 and the unlocking of the brake.

The opening of the contact b of the relay 198 also breaks a circuit which will be described hereinafter and which produces the excitation of the electric valve 147 which, therefore, then returns into its position of rest (not shown) and thus produces the withdrawal of the lower piston 28.

At the end of its travel, the lower piston 28 operates a switch 199 which then forms a circuit between the terminals 172 and 181 of the box. The closing of this circuit produces the operation of a relay 201, the winding of which is connected, on the one hand, to the feed terminal 165 of the box and, on the other hand, to the above mentioned terminal 181, this relay closing a contact which makes a circuit between the feed terminal 166 and the terminal 180 of the box and thus insuring the operation of the electric valve 143, the winding of which is connected between the said terminal 180 and the feed terminal 167, this electric valve then changing position and producing the feeding of the motor 22 of the mechanism for driving the rotating member 21 which begins to rotate in the direction of the arrow B of Figure 11. During the displacement in this direction of the motor 22, the locking cylinder 96 is also fed and the pawl 89 of the driving mechanism is therefore kept in engagement with the disc 81 that is fixed to the member 21 (see Figure 3), the latter thus being driven positively.

The rotation of the rotating member 21 continues until the switch 98 (see Figures 3 and 11) is operated; this takes place after the member 21 has rotated through one-sixth of a revolution. The closing of this switch has the effect of making the following new circuit:

Feed terminal 164, closed movable contact *e* of relay 198, terminal 172, terminal 178, closed switch 98, terminal 177, winding of a relay 202, terminal *c* of the clock 155, and feed terminal 165.

The closing of this circuit produces the operation of the said relay 202 and thus the closing of the two contacts *a* and *b* of the latter.

The closing of the contact *b* of the relay 202 effects the making of a new circuit between the terminals 166 and 170 of the box and thus the operation of the electric valve 147, the winding of which is connected between the terminals 167 and 170 of the box, the said electric valve then being brought back into its initial position represented in Figure 11, and the lower piston 28 rising again to lift the next die 24 which has been brought into its extension as the result of the advance, hereinbefore described, of the rotating member 21.

The cycle of operations which has just been described then recommences to effect the molding of the next head as soon as the lower piston 28 again operates the switch 195 at the end of its upward travel. It is to be noted that, on the operation of the relay 198 which is produced at the beginning of the molding operation, the contact *e* of this relay, through the intermediary of which the relay 202 is excited, opens and that the latter relay 202 then returns to its initial position, the electric valve 147 then being fed only through the contact *b* of the relay 198.

As soon as the lower piston 28 starts, the switch 199 again opens and thus interrupts the excitation of the relay 201, the movable contact of which is included in the circuit for exciting the electric valve 143, returns to its open position. The excitation of the electric valve 143 is then interrupted and the mechanism for driving the member 21 returns to its initial position without driving the member because of the slackening produced at the same time in the cylinder 96 which effected the application of the pawl 89 in a notch of the disc 81.

After this return movement of the driving mechanism of the started rotating member 21, the switch 98 again opens but the relay 202 remains excited because of the previous closing of its movable contact *a* which short-circuits the switch 98.

There should also be mentioned a safety device which is intended to prevent the rising of the lower piston 28 and of the piston 103 of the extractor as long as the rotating member 21 has not been stopped in one of its six angular positions in which the rods of these two pistons can pass freely through the holes 117 (see Figure 5) made in this plate.

This device is constituted by the switch 134 (see Figure 3) which is closed only when the plate 21 is arranged in such a manner that one of the notches 82 of the disc 81 of its indexing mechanism is opposite the roller 138 which is pivoted on the end of the arm 137 that carries the stop 136 which controls the switch 134. As shown in Figure 12, the switch 134 is connected in the feed circuit of the electric valve 147 which controls the displacement of the lower piston 28 and of the piston 103 of the extractor and the operation of this electric valve with a view to insuring that the raising of these pistons should be capable of being effected only if the switch 134 has previously been closed.

It remains to describe the operation of the mechanism for charging the injection box which is represented in Figures 8 and 9. The displacement of the slide valve 118 of this mechanism is effected by a piston which is housed in the cylinder 124, the feeding of which is controlled by the electric valve 144. The mechanism is arranged so as to keep the degree of filling of the injection box 6 between predetermined limits. For this purpose, the charging slide valve 118 is operated only if the injection piston 13 has previously reached a bottom limiting position in which a pusher 204, which is fixed to the piston rod (see Figure 12), closes a switch 205. The closing of this switch makes a circuit between the terminals 164 and 173 of the box and thus produces the excitation of a relay 206, the winding of which is connected between the terminal 173 and the terminal 165 of the box. The operation of the relay 206 produces the closing of its contacts *a* and *b*, the first of these contacts making a circuit between the terminal 173 and the terminal 174 of the box, the latter terminal being connected to the terminal 164 of the box by a circuit made by a switch 208 that is operated by a pusher 209 which is located on the trajectory of the slide valve 118 and which remains closed as long as the said slide valve is in an advanced position. The making of this circuit insures the maintenance of the excitation of the relay 206 notwithstanding the opening of the switch 205 which is produced on the rising of the injection piston 13.

The closing of the contact *b* of the relay 206 also makes a circuit between the terminals 175 and 176 of the box, the former of which is connected to the feed terminal 16 of the box by means of the controlling winding of the electric valve 166, which controls the feeding of the cylinder 124 controlling the charging slide valve, and the second of which is connected to the feed terminal 166 of the box by means of a switch 211 arranged to be closed by the pusher 204 only when the injection piston 13 is in its top position, the rod 14 of this piston then being withdrawn from the injection box 6 and the bore 121 of the slide valve.

The closing of the switch 211 insures the making of the excitation circuit of the electric valve 144 which changes position and then effects the withdrawal of the slide valve 118 until it is in the withdrawn position represented in Figure 9, in which the charge material contained in the hopper 123 fills the bore 121 of the slide valve.

When it reaches its position of maximum withdrawal which is fixed by a regulatable stop 212, the slide valve operates the pusher 209 and thus produces the opening of the switch 211 and, consequently, the interruption of the excitation of the relay 206. This relay is then de-energized and produces, by the opening of its contact *b*, the interruption of the feeding circuit of the electric valve 144 which resumes its initial position and produces the return of the charging slide valve into its advanced position, the charge contained in its bore 121 being thus transferred into the injection box 6.

The material contained in the injection box 6 is raised by the heating member 7 surrounding this box to a temperature which is sufficient to insure the welding of the molded head to the end of the length of tube 31 which is intended to constitute the body of the tube. This temperature depends especially on the thickness of the wall of the length of tube and is regulated automatically by a thermostat (not shown) which controls the feeding of the heating member 7.

The stabilizing time of the molded head itself depends upon the temperature of injection, upon the material used and upon the volume of the molded head. In order to adapt the machine to the manufacture of tubes of different sizes (after replacing the dies 24 and the matrix 25 and effecting any necessary regulation of the position of the bridge carrying the injection box 6), the interval of opening of the mold can easily be changed by altering the preliminary regulation of the clock 155.

It is to be noted that the different operations of the cycle of operations of the machine are effected automatically from the time of the finished preceding operation and that, therefore, only the regulation of the clock determines the rate of production by the machine which can thus be easily altered to take particular conditions of injection into account. This arrangement has the advantage of rendering possible the rapid adaptation of the machine to the manufacture of tubes or receptacles of different types.

Although it is intended more particularly for the molding of heads of flexible tubes, this machine, after replacement of the dies and matrix represented, may also be advantageously employed for the molding of other articles of plastic material.

In a modification, the matrix may be divided in order to obtain the simultaneous injection of a plurality of articles, the number of dies or the advance of the rotating member having, of course, to be adapted to the number of matrices fed from one injection box or from more than one injection box.

We claim:

1. An injection machine for molding plastic ends on tubular plastic elements including in combination a heated injector box having thermoplastic material therein and a nozzle, a matrix located at an injection station adjacent but normally spaced slightly from the nozzle and in line therewith for receiving plastic material therefrom; a rotating member spaced from the matrix with a peripheral portion thereof in line with the matrix and nozzle, a plurality of tube-receiving mandrels movably carried by said rotating member for movement into and out of registration with said matrix in response to rotation of said member, said mandrels being of a length such that their tips approach but clear the matrix when in its normal spaced position, whereby said mandrels except at the injection station have approach room adjacent their free ends such that plastic tubular elements may be readily placed on said mandrels before they reach said injection station and completed articles may be readily removed from said mandrels after they leave the injection station without interference from said matrix, means when a mandrel is moved in registration with the matrix for moving the mandrel endwise so that the same coacts with the matrix to form a mold, and means for injecting the plastic material from the box into the mold.

2. A machine according to claim 1, wherein each of said mandrels is connected to and movable with a pusher, and wherein the said matrix includes movable mold-forming elements actuable by said pushers and housed in a case having two assembled parts, one of these parts being traversed by a passage for the admission of material coming from the injection box and the other part being provided with an orifice for the pusher which actuates the said mold-forming element.

3. A machine according to claim 1 wherein the mandrels each have two elements, one of which is adapted to be raised and lowered relative to the other and comprises a part of the end of the mandrel intended to be engaged in the said matrix, the said one element being adapted to be displaced for the purpose of ejecting a molded article covering the mandrel.

4. A machine according to claim 3 wherein the said one element which is adapted to be raised and lowered has a tubular rod which is co-axial with a longitudinal passage made in the other element and which is traversed by at least one orifice leading to the boundary separating its part from the said other element, this orifice being intended for the passage of compressed air to thereby effect the ejection of the molded article.

5. A machine according to claim 1 in which said means for injecting the plastic material includes a first fluid-actuated piston applied to press the material to be injected into the injection box, and in which said means for moving the mandrels endwise includes a plunger opposite the matrix and a second fluid-actuated piston for moving the plunger and a mandrel in registry therewith towards the matrix to bring the mandrel into engagement with the matrix, means for effecting the displacement of the said plunger piston comprising a first electric valve, means for effecting displacement of the injection piston comprising a second electric valve, means for controlling the electric circuit of the second electric valve to insure the descent of the injection piston comprising a switch operable by displacement of the plunger piston, thereby causing injection on the rise of the plunger piston, means operable by said switch for changing the excitation circuit of the said two electric valves after a predetermined time delay in order to insure the withdrawal of the said two pistons when the molding operation has been effected, said last-named means comprising a clock control mechanism.

6. A machine according to claim 5 including a third electric valve controlling a motor which effects the indexing of the rotating member, means for energizing the electric circuit of the said third electric valve, said last mentioned means comprising a switch operable upon withdrawal of said first plunger piston to produce automatic indexing of the said rotating plate when said plunger piston has been withdrawn.

7. An injection machine as called for in claim 1, in which means are provided for automatically doffing the tubular element with its attached plastic end from the mandrel when the mandrel with the element thereon is moved past the matrix.

8. A machine according to claim 1 wherein the matrix is axially movable with each mandrel to move into contact with the injection box, and which includes abutment means on said matrix and a stop member fixed in the path of said abutment means for limiting the travel of said matrix independently of its contact with the injection box.

9. A machine according to claim 1 in which each of said means is separate from the other and each includes a fluid-actuated piston for exerting the required force and producing the required movement.

References Cited in the file of this patent

UNITED STATES PATENTS

| Re. 21,094 | Brating | May 23, 1939 |
| 2,131,319 | Greenholtz et al. | Sept. 27, 1938 |
| 2,155,316 | Lauterback | Apr. 18, 1939 |
| 2,327,227 | Tucker | Aug. 17, 1943 |
| 2,358,857 | Gits | Sept. 26, 1944 |
| 2,479,383 | MacMillin | Aug. 16, 1949 |
| 2,526,797 | Ashbaugh | Oct. 24, 1950 |
| 2,565,522 | Renier | Aug. 28, 1951 |
| 2,577,412 | Ferrell | Dec. 4, 1951 |

FOREIGN PATENTS

| 549,556 | France | Nov. 23, 1922 |
| 517,740 | Belgium | Mar. 14, 1953 |